(12) United States Patent
Ulcej

(10) Patent No.: US 7,056,112 B2
(45) Date of Patent: Jun. 6, 2006

(54) EXTRUSION DIE AND METHOD FOR USING THE SAME

(75) Inventor: John A. Ulcej, Colfax, WI (US)

(73) Assignee: Extrusion Dies Industries, LLC, Chippewa Falls, WI (US)

( * ) Notice: Subject to any disclaimer, the term of this patent is extended or adjusted under 35 U.S.C. 154(b) by 309 days.

(21) Appl. No.: 10/452,364

(22) Filed: Jun. 2, 2003

(65) Prior Publication Data

US 2004/0238995 A1 Dec. 2, 2004

(51) Int. Cl.
B29C 47/16 (2006.01)

(52) U.S. Cl. .................... 425/461; 425/466; 264/176.1

(58) Field of Classification Search .................... None
See application file for complete search history.

(56) References Cited

U.S. PATENT DOCUMENTS

| | | | | |
|---|---|---|---|---|
| 2,713,313 A | * | 7/1955 | Femina | 425/461 |
| 3,217,358 A | * | 11/1965 | Kihara | 425/382.4 |
| 3,335,459 A | | 8/1967 | Tyrner | 18/12 |
| 3,344,473 A | * | 10/1967 | Achterberg et al. | 425/380 |
| 3,431,163 A | | 3/1969 | Gilbert | 161/161 |
| 3,680,997 A | | 8/1972 | Dukert et al. | 425/381 |
| 3,759,653 A | * | 9/1973 | Schreiber | 425/461 |
| 3,860,383 A | * | 1/1975 | Sirevicius | 425/461 |
| 3,915,606 A | * | 10/1975 | Straub et al. | 425/113 |
| 3,988,097 A | * | 10/1976 | Anders et al. | 425/192 R |
| 4,105,728 A | * | 8/1978 | Lee | 264/40.7 |
| 4,197,069 A | | 4/1980 | Cloeren | 425/131.1 |
| 4,285,655 A | * | 8/1981 | Matsubara | 425/461 |
| 4,411,614 A | * | 10/1983 | Feathers | 425/466 |
| 4,600,550 A | * | 7/1986 | Cloren | 264/173.13 |
| 4,990,293 A | | 2/1991 | Macosko et al. | 264/40.1 |
| 5,020,984 A | | 6/1991 | Cloeren et al. | 425/141 |
| 5,176,925 A | | 1/1993 | Weber et al. | 425/191 |
| 5,223,276 A | | 6/1993 | Djordjevic et al. | 425/131 |
| 5,234,649 A | * | 8/1993 | Cloeren | 264/173.16 |
| 5,281,380 A | * | 1/1994 | Umeda et al. | 264/108 |
| 5,401,454 A | | 3/1995 | Mendel | 264/176.1 |
| 5,424,018 A | | 6/1995 | Paul et al. | 264/176.1 |
| 5,494,429 A | | 2/1996 | Wilson et al. | 425/192 |
| 5,635,222 A | | 6/1997 | Meidhof | 425/192 |
| 5,750,159 A | * | 5/1998 | Delmore et al. | 425/190 |
| 6,057,000 A | * | 5/2000 | Cai | 427/358 |
| 6,109,592 A | * | 8/2000 | Lippert et al. | 251/331 |
| 6,206,680 B1 | * | 3/2001 | Ulcej | 425/382.4 |
| RE37,293 E | | 7/2001 | Cloeren et al. | 425/141 |
| 6,340,123 B1 | * | 1/2002 | Lee et al. | 239/552 |
| 6,352,424 B1 | * | 3/2002 | Ulcej | 425/145 |
| 6,367,776 B1 | * | 4/2002 | Lippert et al. | 251/331 |
| 6,398,535 B1 | | 6/2002 | Cloeren | 425/131.1 |
| 2002/0105106 A1 | | 8/2002 | Wu et al. | 264/46.1 |

FOREIGN PATENT DOCUMENTS

JP 61-291117 * 12/1986
JP 62-122731 * 6/1987

* cited by examiner

Primary Examiner—Mark Eashoo
(74) Attorney, Agent, or Firm—McCracken & Frank LLP

(57) ABSTRACT

An improved extrusion die and a method for using the same that minimizes the deflection of the die exit by providing the walls of the extrusion die with areas of increasing thickness that increase from the die ends to a central location. The die wall thickness is varies such that there is minimal deflection created at the die exit.

9 Claims, 8 Drawing Sheets

EXTRUSION DIE AND METHOD FOR USING THE SAME

TECHNICAL FIELD

This invention relates to an extrusion apparatus and more particularly to extrusion dies for extruding thermoplastic material to produce a sheet of substantially uniform thickness.

BACKGROUND OF THE INVENTION

An extrusion die is used to extrude molten thermoplastic material into a relatively thin film or sheet. Conventional extrusion dies have a die cavity with the general shape of a coat hanger. These extrusion dies have been generally referred to a coat hanger dies. Typical coat hanger dies include an inlet, an inlet manifold, a generally triangular shaped preland portion, a melt well, and a die exit or gap. In these dies, a back edge of the preland portion includes linear edges that form a taper converging towards a die entrance. The preland portion provides a resistance to flow that varies over the width of the die to uniformly spread the thermoplastic material across the entire die.

The rheological characteristics of the molten thermoplastic materials and the pressure these thermoplastic materials exert on the die bodies result in clamshelling, or nonuniform deflection. Clamshelling results in uneven flow of the thermoplastic material through the die exit. These or other nonuniform patterns are undesirable for the production of flat sheet materials. The nonuniformities can be corrected by adjusting the die lip exit gap. Most extrusion dies are equipped with some form of lip adjustment mechanism to adjust the gap. If a particular die is to used to form a large quantity of a single layer of material, and the extrusion process is not subject to any interruptions, the adjustment of the gap is an acceptable method of removing or at least addressing these nonuniformities. However, since the performance of an extrusion die is influenced by a number of factors including flow rate, temperature, the nature of the thermoplastic materials, and the like, the use of the lip adjustment mechanism to remove or minimize these nonuniformities is not practical where a die is to be used for short runs to produce different products. For each production change the die lips must be the empirically adjusted to the new conditions. This results in a loss of production time and a waste of material as off specification product is produced during start up.

The nonuniformity that is created in these prior die designs is more serious when two or more layers of a thermoplastic material are to be coextruded. In these cases, the formation of the M or W shaped boundaries between the co-extrusion layers creates an interfacial deformation that cannot be corrected by adjusting the die exit gap using the lip adjustment mechanism.

In the past, there have been proposals to address these problems mostly through the design of different manifold configurations. In one such design, the back line of the preland portion is structured to be a uniform distance from the die exit. While this particular design does minimize the above problems, there are concerns relative to maintaining the flow through the die without creating areas of substantially higher residence time that over time could lead to the degradation of the thermoplastic material.

SUMMARY OF THE INVENTION

In accordance with the present invention, an extrusion die comprises mating die portions having die walls defining a die inlet, a substantially straight-line die exit and a die cavity. The die cavity includes a manifold that is in fluid communication with the die inlet and the die exit, and has a back wall located a varying distance from the die exit, and side walls. The die walls have a wall thickness that varies dependent on a pressure exerted on the die exit such that there is substantially uniform deflection of the die exit.

In a further embodiment of the present invention, a method of controlling the flow of an extrudate from an extrusion die comprises the steps of extruding the extrudate from a die manifold between a substantially straight line die exit, where the die manifold has a back wall located a varying distance from the die exit; and controlling a deflection of the die exit by providing a die wall having a wall thickness that varies in thickness along a length of the die wall corresponding to a pressure level exerted on the die exit by the extrudate.

DESCRIPTION OF THE PREFERRED EMBODIMENTS

Figure 1:
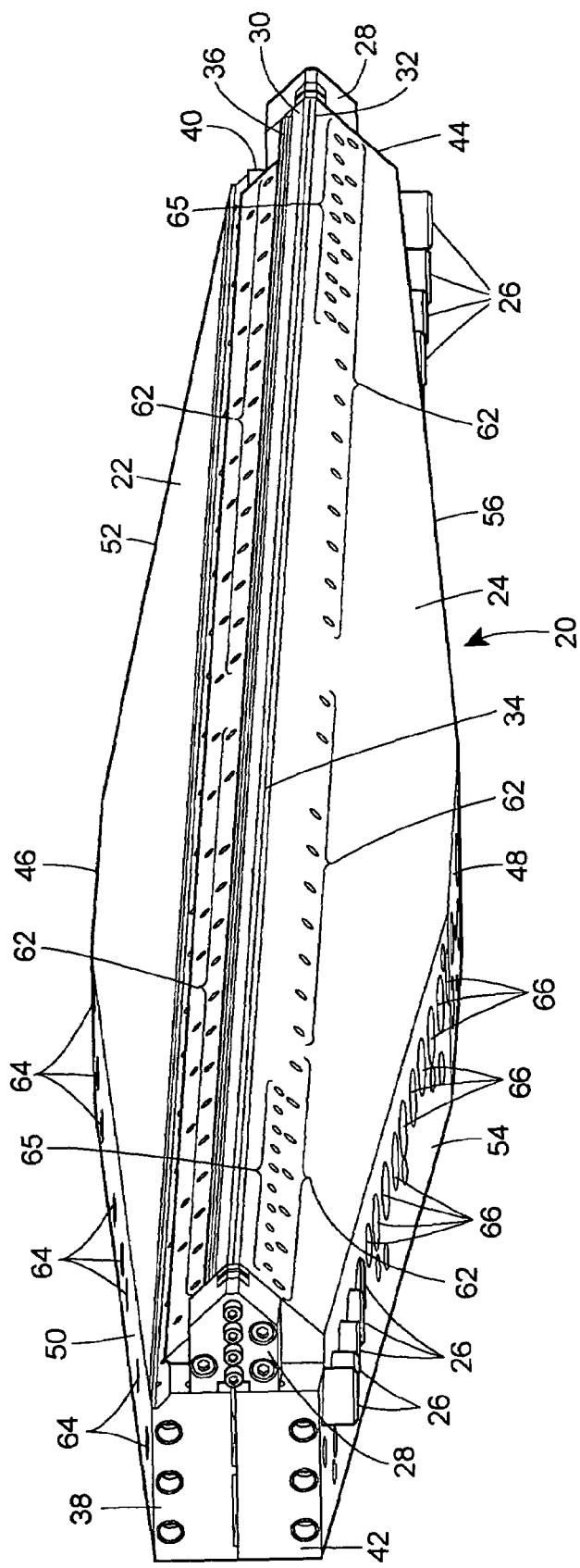
FIG. 1 is an isometric view of one embodiment of the extrusion die of the present invention.
Figure 2:
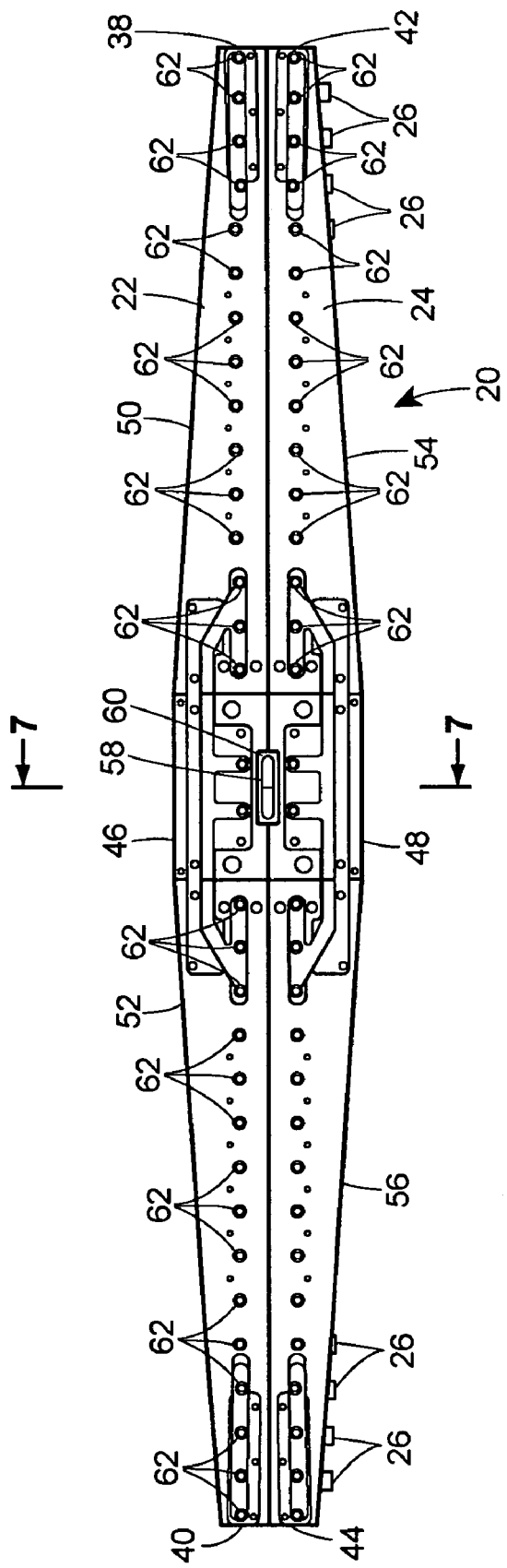
FIG. 2 is a plan view of the embodiment of FIG. 1 taken from the opposite side.
Figure 3:
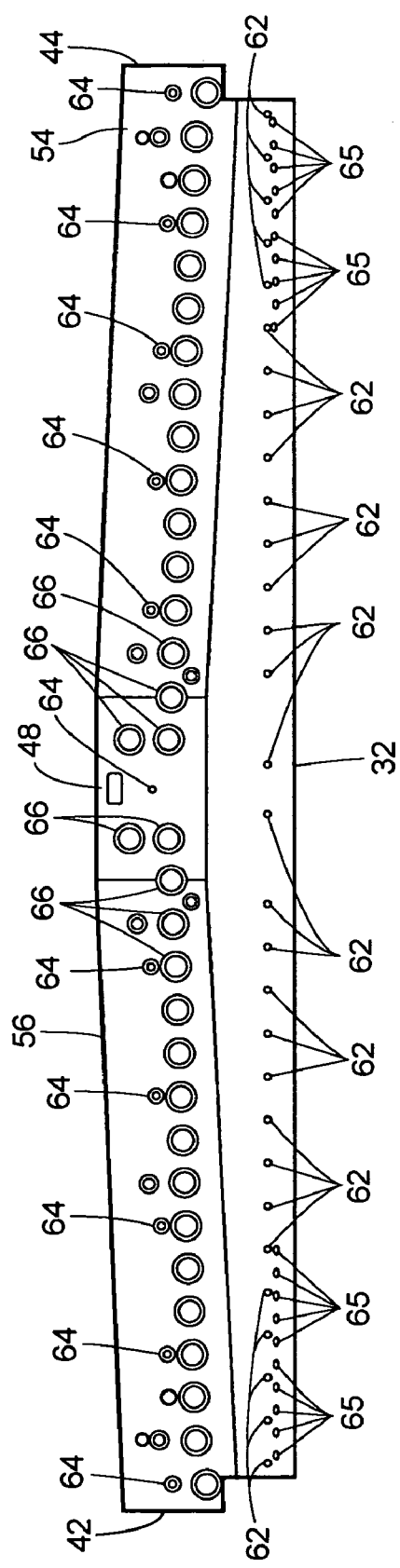
FIG. 3 is a plan view of the exterior of the upper die body of FIG. 1.
Figure 4:
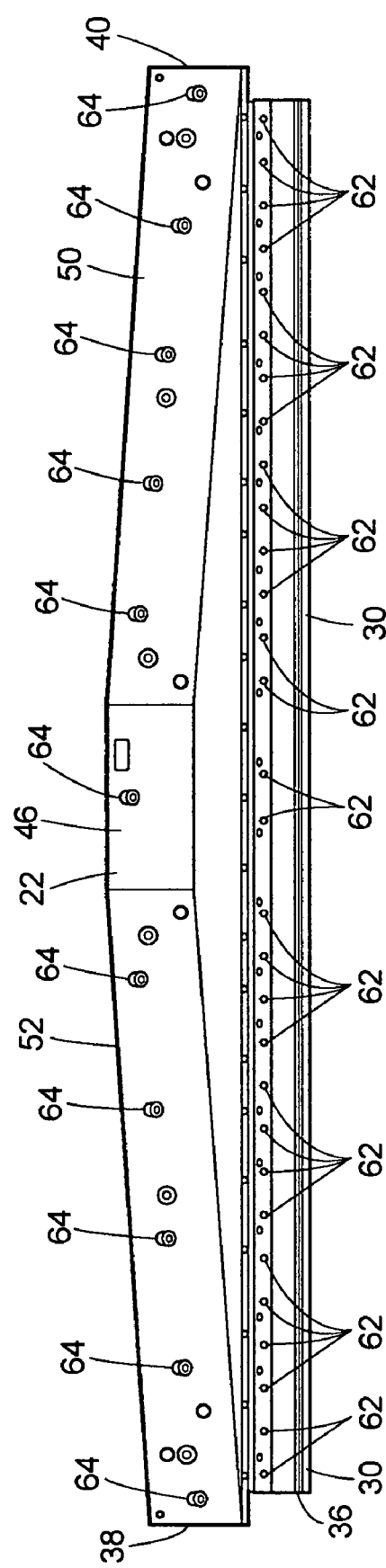
FIG. 4 is a plan view of the exterior of the lower die body of FIG. 1.

As shown in FIGS. 1 to 4, an extrusion die 20 has an upper die body 22 and a lower die body 24. The upper die body 22 and the lower die body 24 are joined together by a series of body bolts 26. Two end plates 28 are affixed to the upper die body 22 and the lower die body 24 as the two die bodies 22 and 24 are joined together. The end plates 28 seal the sides of the die 20 near an upper die lip 30 and a lower die lip 32. The upper die lip 30 and the lower die lip 32 define a die exit 34. The upper die body 22 includes a die lip adjustment channel 36 that can accept any conventional die lip adjustment mechanism (not shown). The upper die body 22 has two upper die body ends 38 and 40. The lower die body 24 also has two similar lower die body ends 42 and 44 that are coextensive with the upper die body ends 38 and 40. Each of the upper die body 22 and the lower die body 24 has a central area 46 and 48 intermediate of the respective die body ends 38, 40, 42, and 44. Between the die ends 38, 40, 42 and, 44 and the central areas 46 and 48 are areas of increasing thickness 50, 52, 54, and 56.

A die inlet 58 is located within the central areas 46 and 48. The die inlet 58 can be connected to any conventional extrusion device (not shown) by conventional means. A die inlet seal area 60 surrounds the die inlet 58 to enable the extrusion die 20 to form a fluid tight seal when attached to the extrusion device. A series of heater holes 62 extend through the upper die body 22 and the lower die body 24. Any conventional heating device (not shown) can be inserted into these holes to provide a source of heat to the extrusion die 20. A series of thermocouple orifices 64 are provided in upper die body 22. Any conventional thermocouple device (not shown) can be inserted into the thermocouple orifices 64. The thermocouple devices cooperate with the heating devices to maintain the proper temperature control for the extrusion die 20. Also shown on the lower die body 24 are a series of deckle tabs 65. The deckle tabs 65 enable a conventional deckle device (not shown) to be attached to the extrusion die 20 to vary the width of the film produced from the die exit 34.

The extrusion die 20 includes the areas of increasing thickness 50, 52, 54, and 56. These areas of increasing thickness 50, 52, 54, and 56 provide sufficient rigidity to the extrusion die 20 such that the die exit 34 either does not deform or deforms at a relatively uniform rate across the length of the die exit 34 when the flow rate or the composition of the polymer to be extruded is changed. The areas of increasing thickness 50, 52, 54, and 56 increase in a linear fashion from the respective die ends 38, 40, 42, and 44 to the central area 46 and 48 surrounding the die inlet 58. It is believed that the areas of increasing thickness 50, 52, 54, and 56 provide increased rigidity to the extrusion die 20 to minimize any deformation of the die exit 34 because of changes to the flow rate, temperature, or composition of the polymer to be extruded through the extrusion die 20. The exact ratio of thickness between the respective die ends 38, 40, 42, and 44 and the central areas 46 and 48 is determined empirically. It has been found that a relative increase of between about 75 to about 150%, and preferably from about 100 to about 135%, provides adequate increase rigidity to the extrusion die 20 to minimize changes to the die exit 34. The extrusion die 20 as shown in FIGS. 1 to 4 is about 5.5 inches thick at the die ends 38, 40, 42, and 44 and about 12 inches thick at the central areas 46 and 48. This is a relative increase in thickness of about 118%. While the variation in wall thickness has been described relative to FIGS. 1 to 4 as increasing from the die ends 38, 40, 42, and 44 to the central areas 46 and 48, for certain die configurations it is possible that the variation in wall thickness might be a complex relationship that both increases and decreases in thickness across the width of the die.

Figure 5:
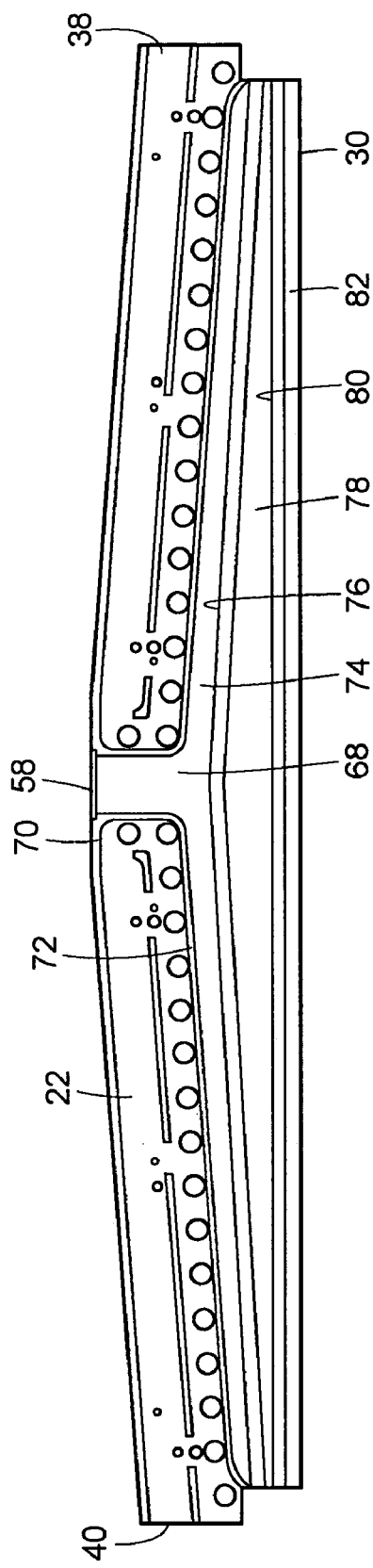
FIG. 5 is a plan view of the interior of the upper die body of FIG. 1.
Figure 6:
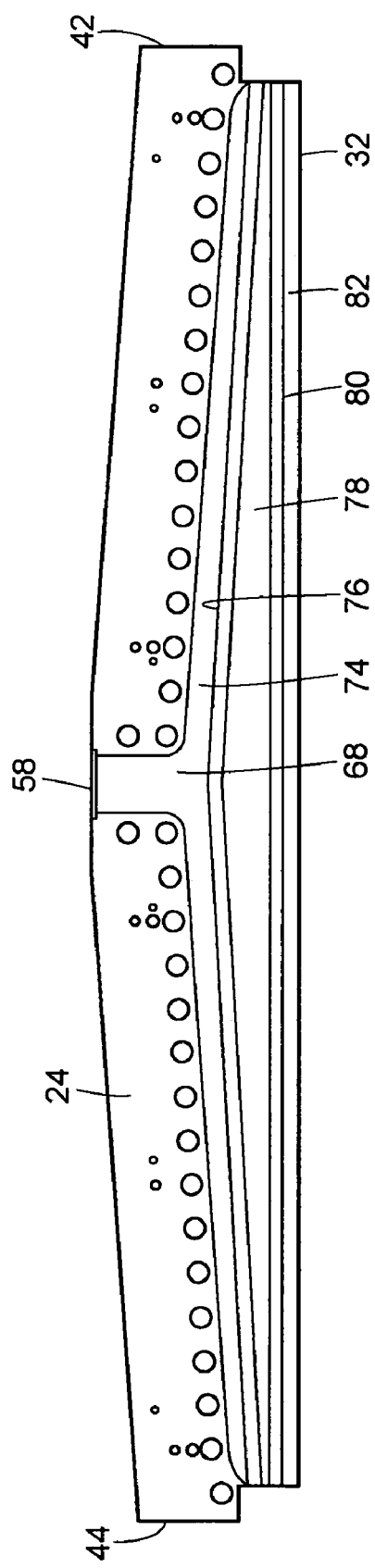
FIG. 6 is a plan view of the interior of the lower die body of FIG. 1.

As shown in FIGS. 5 and 6, the body bolts 26 pass through body bolt holes 66 to join the upper die body 22 to the lower die body 24. The body bolt holes 66 are located outside of a manifold 68. As shown in FIG. 5, a sealing surface 70 is formed around the die inlet 58 and a back edge 72 of the manifold 68. This sealing surface 70 forms a seal when the upper die body 22 and the lower die body 24 are joined together. The manifold 68 is a standard coat hanger type die manifold. In this regard, the manifold 68 includes a cavity 74 defined by the back edge 72 and by a preland back line 76 of a preland portion 78. The manifold 68 also includes a secondary manifold 80 that is downstream from the preland portion 78. In the area immediately downstream from the secondary manifold 80 and upstream from the die exit 34 is a land portion 82. The exact structure of the manifold 68, the cavity 74, the preland portion 78, the secondary manifold 80 and the land portion 82 can be varied and may conform to any of a number of different conventional designs for a coat hanger type extrusion die.

Figure 7:
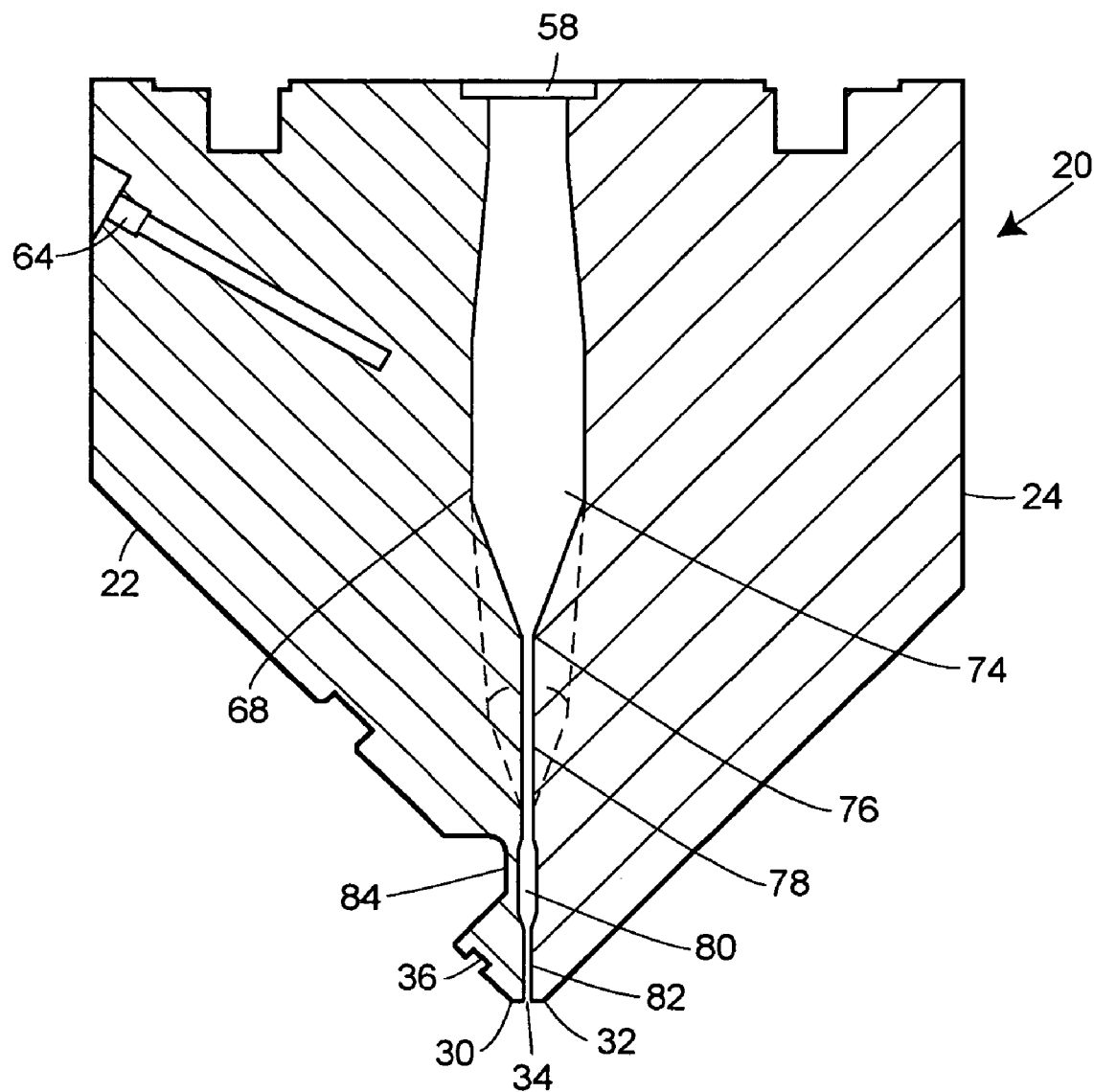
FIG. 7 is a cross sectional view taken along line 7—7 of FIG. 2.

As shown in FIG. 7, the upper die lip 30 and the lower die lip 32 of the extrusion die 20 form the die exit 34. The upper die lip 30 includes the die lip adjustment channel 36 that can accept any of a number conventional die lip adjustment mechanisms. The upper die lip 30 includes a relatively thin flex zone 84 that enables the upper die lip 32 to be adjusted by the die lip adjustment mechanism.

Figure 8:
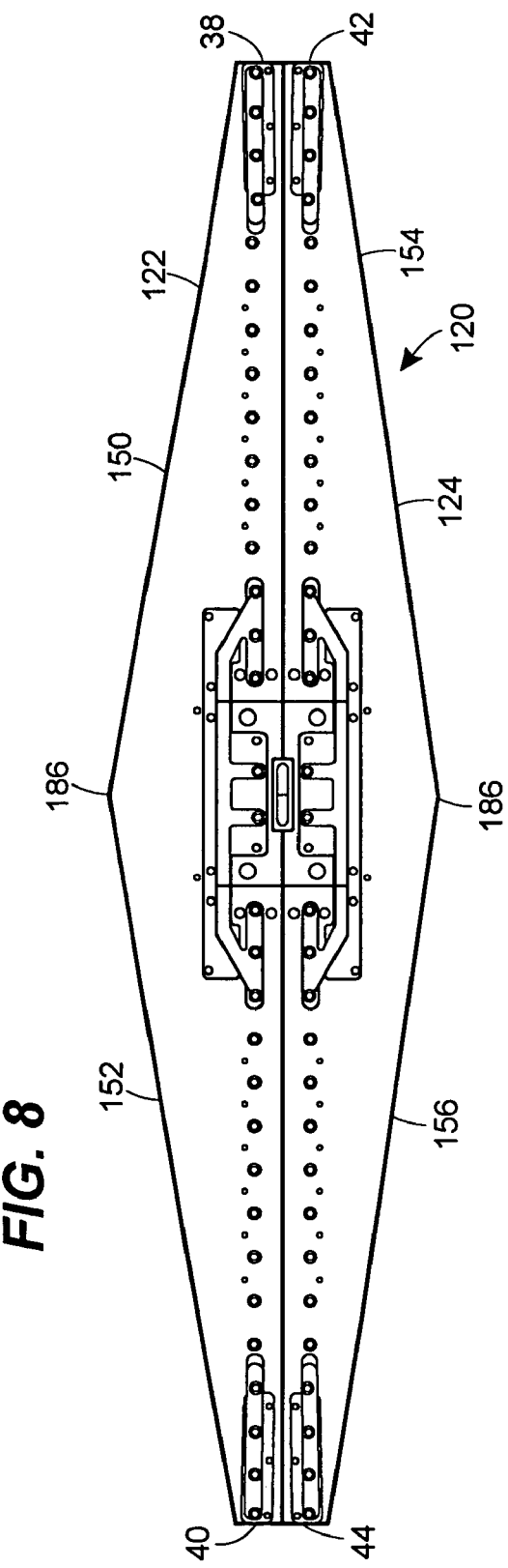
FIG. 8 is a view similar to FIG. 2 of an alternative embodiment.

FIG. 8 shows an alternative embodiment of the present invention where an extrusion die 120 has an upper die body 122 and a lower die body 124. The upper die body 122 and the lower die body 124 have areas of increasing thickness 150, 152, 154, and 156 that increase in a linear fashion from the die ends 38, 40, 42, and 44 to a central line 186. The extrusion die 120 will perform in a manner similar to that of the extrusion die 20 described above. In the embodiment of FIG. 8, the relative ratio between the thickness of the extrusion die 120 at the die ends 38, 40, 42 and 44 and the central line 186 is about 125%.

Figure 9:
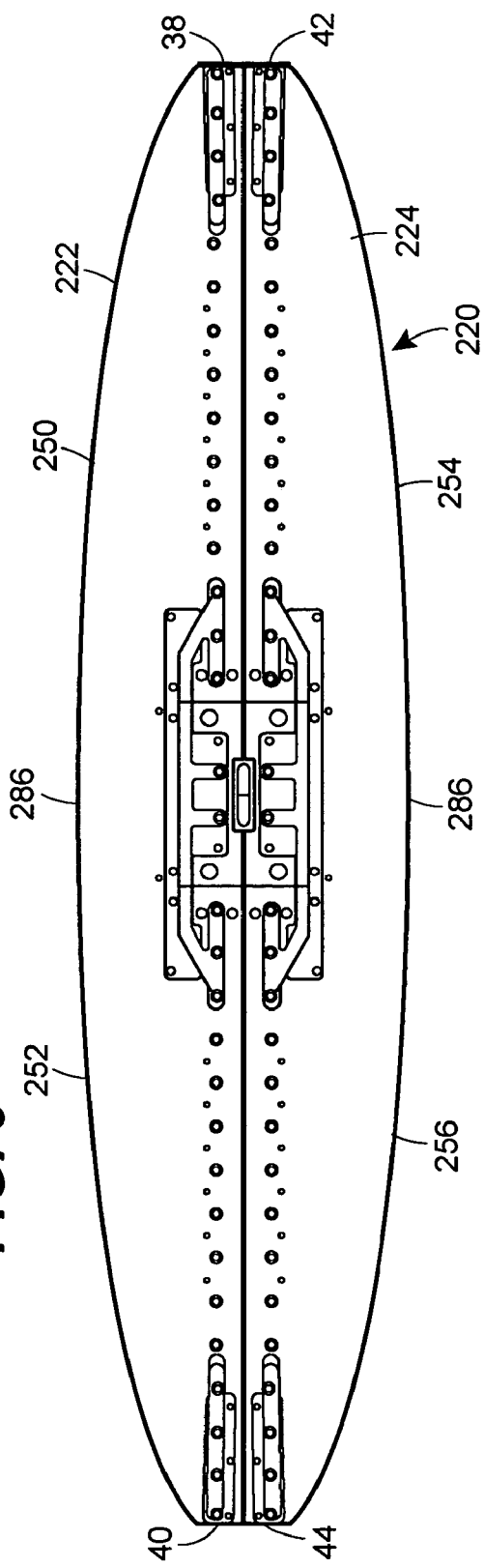
FIG. 9 is a view similar to FIG. 2 of a still further embodiment.

FIG. 9 shows a further embodiment of the present invention where the change in the thickness of an extrusion die 220 is non-linear. An upper die body 222 and a lower die body 224 have areas of increasing thickness 250, 252, 254, and 256 that increase in an elliptical fashion between die ends 38, 40, 42 and 44 and a central line 286.

INDUSTRIAL APPLICABILITY

The preceding embodiments are applicable to extrusion dies for use in extruding sheets of thermoplastic films without deformation of the die exit. This prevents the formation of variations in thickness or other irregularities in the extruded product.

Numerous modifications to the present invention will be apparent to those skilled in the art in view of the foregoing description. Accordingly, this description is to be construed as only illustrative or exemplary of the claimed invention and is presented for the purpose of enabling those skilled in the art to make and use the invention and to teach the best mode of carrying out same. The exclusive rights to all modifications which come within the scope of the appended claims are reserved.

I claim:

1. An extrusion die comprising:
    mating die body portions, each mating die body portion having a mating die wall on one side of the mating die body portion such that when the mating die body portions are assembled the mating die walls define a die inlet, a substantially straight-line die exit and a die cavity, each mating die body portion having an exterior surface on the side of the mating die body portion opposite the mating die wall, the exterior surface being spaced from the mating die wall by a thickness dimension that varies along the length of the die exit by an amount dependent on a pressure exerted on the die exit such that there is substantially uniform deflection of the die exit,
    wherein the die cavity includes a manifold that is in fluid communication with the die inlet and the die exit, the manifold having a back wall located a varying distance from the die exit, and side walls.

2. The extrusion die of claim 1, wherein the thickness dimension increases from each side wall to a maximum thickness dimension at an area substantially between the side walls.

3. The extrusion die of claim 2, wherein the increase in the thickness dimension is linear.

4. The extrusion die of claim 2, wherein the increase in the thickness dimension is non-linear.

5. The extrusion die of claim 2, wherein the increase in the thickness dimension has a relative increase of between about 75 to about 150% from the side walls to the area substantially between the side walls.

6. The extrusion die of claim 1, wherein the die manifold is a coat hanger manifold.

7. The extrusion die of claim 1, wherein the thickness dimension in the area substantially between the side walls is uniform.

8. The extrusion die of claim 1, wherein the mating die body portions are joined together by a series of body bolts that extend through the mating die body portions.

9. The extrusion die of claim 8, wherein the body bolts extend through an area outside the manifold.

* * * * *